United States Patent
Chitale

(10) Patent No.: US 7,792,055 B2
(45) Date of Patent: Sep. 7, 2010

(54) METHOD AND SYSTEM FOR DETERMINING THE TOPOLOGY OF A NETWORK

(75) Inventor: Ajay Shrikant Chitale, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 375 days.

(21) Appl. No.: 11/688,015

(22) Filed: Mar. 19, 2007

(65) Prior Publication Data

US 2007/0230367 A1 Oct. 4, 2007

(30) Foreign Application Priority Data

Mar. 30, 2006 (IN) .......................... 579/CHE/2006

(51) Int. Cl.
*H04L 12/28* (2006.01)
*H04J 3/24* (2006.01)
*H04L 12/50* (2006.01)

(52) U.S. Cl. ........................ 370/254; 370/349; 370/359

(58) Field of Classification Search ....................... None
See application file for complete search history.

(56) References Cited

U.S. PATENT DOCUMENTS

| | | | | |
|---|---|---|---|---|
| 7,146,630 B2 * | 12/2006 | Dravida et al. | ............... | 725/111 |
| 7,383,574 B2 * | 6/2008 | Burrows et al. | ............... | 726/13 |
| 7,440,573 B2 * | 10/2008 | Lor et al. | ..................... | 380/270 |
| 7,516,201 B2 * | 4/2009 | Kovacs et al. | ............... | 709/223 |
| 7,548,946 B1 * | 6/2009 | Saulpaugh et al. | .......... | 709/203 |
| 2007/0097991 A1 * | 5/2007 | Tatman | .................. | 370/395.53 |

* cited by examiner

*Primary Examiner*—Chirag G Shah
*Assistant Examiner*—Nima Mahmoudzadeh

(57) ABSTRACT

The present invention relates to a method for determining the topology of a network. The method, including the step of a generic agent communicating with a plurality of network devices, using a network management protocol, in order to extract data about the network; wherein the generic agent includes a communication algorithm and wherein each network device corresponds to one of a plurality of network device types and the algorithm is adjusted for each network device using a configuration schema based on the corresponding network device type.

13 Claims, 3 Drawing Sheets

METHOD AND SYSTEM FOR DETERMINING THE TOPOLOGY OF A NETWORK

This application claims priority from Indian patent application 579/CHE/2006, filed on Mar. 30, 2006. The entire content of the aforementioned application is incorporated herein by reference.

BACKGROUND TO THE INVENTION

In networks, such as Local Area Networks (LANs), it can be necessary to determine the topology of the network. The topology of the network is the devices attached to the network and the interconnectivity of the devices. Devices on the network include switches, routers, servers, and any other network capable device.

There are numerous products for determining network topology. One of these products is HP Openview NNM-ET. This product operates by discovering device existence, the devices' configurations, IP connectivity, Layer 2 (L2) connectivity, VLAN configurations, and other protocol configurations (such as OSPF, HSRP). This discovery process is carried out using various software modules focussed on each of the above aspects.

SUMMARY OF THE INVENTION

In brief, this invention provides a method for determining the topology of a network, including the step of: a generic agent communicating with a plurality of network devices, using a network management protocol, in order to extract data about the network; wherein the generic agent includes a communication algorithm and wherein each network device corresponds to one of a plurality of network device types and the algorithm is adjusted for each network device using a configuration schema based on the corresponding network device type.

BRIEF DESCRIPTION OF THE DRAWINGS

Embodiments of the invention will now be described, by way of example only, with reference to the accompanying drawings in which.

DETAILED DESCRIPTION OF EMBODIMENTS

Figure 1:
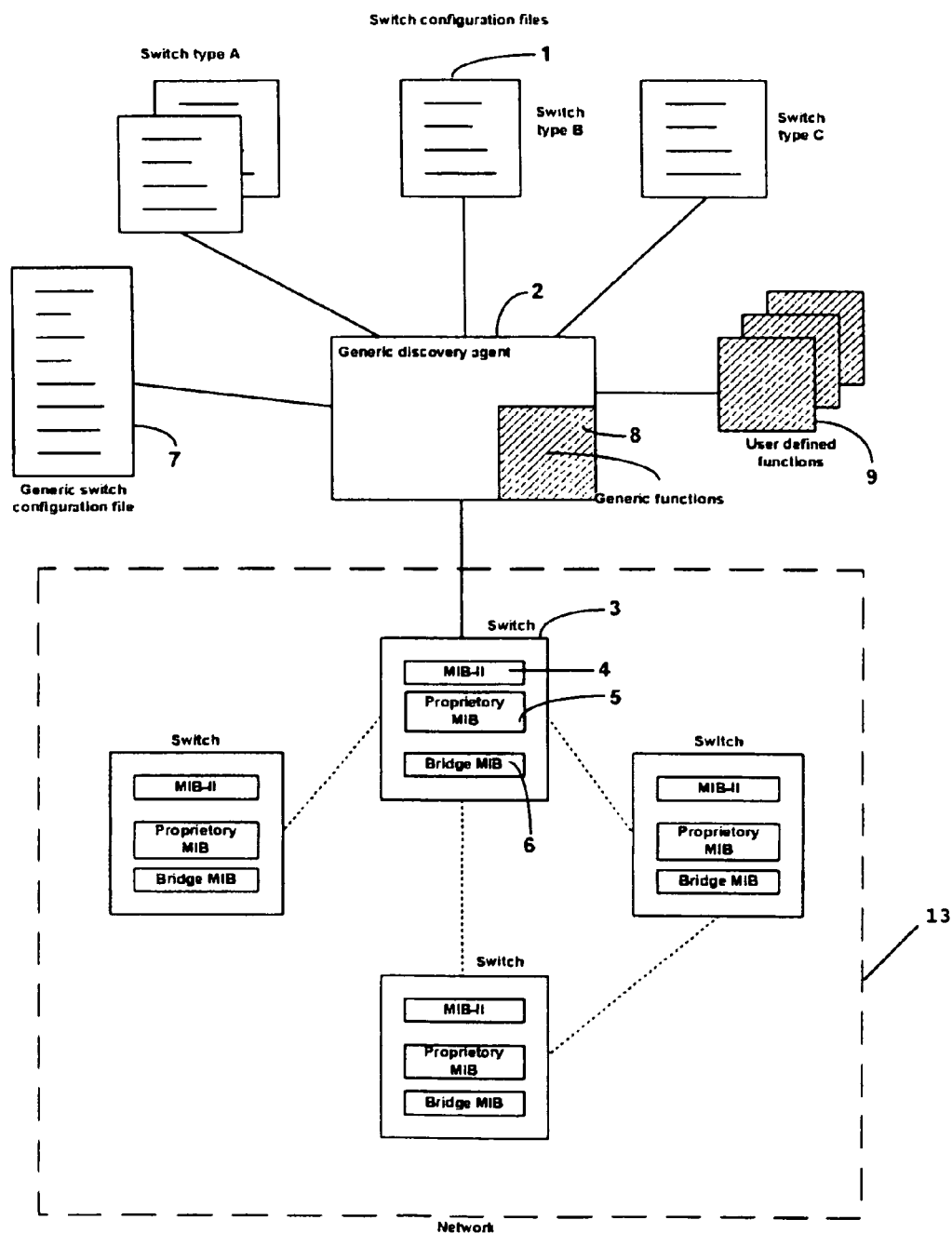
FIG. 1 shows a diagram illustrating how devices are interrogated to determine VLAN topology.

A network switch can be configured at Layer 2 to define connectivity between the switches. The connectivity may also establish a virtual LAN (VLAN). In order to discover the topology of a VLAN in a network the switches must be queried about their Layer 2 connectivity.

Known topology discovery mechanisms involve establishing L2 connectivity and VLAN discovery by using a discovery agent to communicate with the Simple Network Management Protocol (SNMP) agent of the devices being discovered.

Each of the discovery agents talks with the switch SNMP agent and makes use of Management Information Base (MIB) tables within the switch to extract the L2 connectivity and VLAN information, using the following steps:

i) Extracting interface details from the MIB-II table ii) Extracting further interface details, such as card and port no., from proprietary MIB tables iii) Extracting VLAN configuration details from proprietary MIB tables iv) Extracting L2 connectivity from the Bridge MIB and constructing a forwarding database table Once a network device is discovered, the record is sent to the dispatch table of an agent called the Details Agent. The Details Agent retrieves the basic device information such as system details and whether SNMP is supported, and puts the updated device record into its returns table. Based on the system object id, these device records are sent to the dispatch tables of the Discovery agents. The discovery agents use the standard and proprietary MIBs from the switch and generate the Layer 2 connectivity and VLAN configuration information. All the above agents make use of other software modules (such as a Helper Server) to talk to the actual network.

As an example, one of the ways VLAN configuration information can be retrieved from a Foundry BigIron switch (a product of Foundry Networks Inc.) is given below:

```
For every snVLanByPortVLanId
   Get corresponding SnVLanByPortVLanIndex (required because the table
   is indexed by this field
       Retrieve the snVLanByPortVLanName at the above index value
       Retrieve the snVLanByPortPortList at the above index value
       For every octet in snVLanByPortPortList
           Combine every two octets to get a 16-bit integer.
           Use this value as a index into the snSWPortInfoTable and get the
   snSWPortIfIndex
           Add/Append snVLanByPortVLanId, snVLanByPortVLanName
   to the final output table, indexed by snSwPortIfIndex.
       End For
End For
```

Using this existing model, a new discovery agent must be coded and added for at least every switch vendor that is being supported. In some cases a new discovery agent must be added for each switch family from vendor if the switch families differ significantly.

Thus, in such systems the number of device agents grows with each release of the products concerned. This loads the discovery engine in terms of numbers of processes. Moreover, there is a lot of duplicate code between agents (at least 40%-50%) and all the agents must be modified to respond to any changes in the discovery infrastructure. All the agents must be patched if a defect is found in the code that is common across all the agents or to support any common enhancement, e.g. Tagged VLAN support. Finally, field trial of these agents becomes difficult, as it requires a code change, recompilation and transfer of binary for every problem encountered.

There will be described a method for providing a multi-faceted discovery agent capable of adjusting its L2 connectivity and VLAN discovery algorithms based on the MIB organisation of the network switch that it is communicating with.

It will be appreciated that the method may be used in relation to other network devices.

There will also be described how the MIB organisation of the particular switch type can be captured within an XML representation and then converted to the required algorithm in the form of inter-linked steps within a tree structure.

In the following description the abbreviation MFDA means Multi-Faceted Discovery Agent, L2 means Layer 2 in the TCP/IP protocol stack, MIB means SNMP Management Information Base, NNM-ET means HP Openview Network Node Manager-Extended Topology, and VLAN means Virtual Local Area Network.

A typical discovery algorithm is comprised of several smaller steps that include retrieving SNMP values from a table (either @index—where a specific value is retrieved from the table using the supplied index—or the entire list—where all values are retrieved from the table), calculating values, looping, some decision-making and sometimes special processing, such as bit manipulation.

Each of the steps may depend on one or more earlier steps. For example, a value retrieved from one table could be used as a cross-index into another table.

Though the actual steps and sequencing of these steps vary for each type of the switch, the types of steps that have to be executed remain, in essence, the same.

Referring to FIG. 1, a method of an embodiment will now be described.

The first step of the method is to encapsulate the steps and sequencing information for a switch type within a configuration file 1 (configuration schema) such that the algorithm of a generic discovery agent program 2 can use the configuration file to interrogate a switch 3 to extract information required to determine the topology of one or more VLANs 13 within a network. It will be appreciated that the term network includes internetworks.

The information retrieved as part of the discovery procedure (interrogation) for a switch has three parts:

i) Interface details of the switch being processed. These details assist the generation of the local neighbour details.

ii) VLAN configuration details on the switch being processed. These details assist the generation of the local neighbour details.

iii) A device whose IP address matches one of the entries in the forwarding database table. These details are used to generate the remote neighbour details.

Local neighbours are other switches which are directly connected to the switch that is being interrogated.

Remote neighbours are switches that are indirectly connected (such as via another switch or another network device) to the switch that is being interrogated.

The tables (MIB-II 4, Proprietary MIB 5, Bridge MIB 6) that are accessed and the steps that are used to retrieve data vary for each of the above three parts. The configuration file for each switch type permits the specification of specific scripts for each of the above parts.

There can be multiple approaches to retrieve the information from a single switch type depending on the switch type (for example, presently there are three ways to retrieve this information from Foundry switches). The configuration file can include all the approaches for capturing information from a single switch type.

Much of the interface details information is extracted from the MIB-II table 4 and hence is standard across all switches. A generic configuration file 7 defines a set of generic steps to retrieve this information.

Depending on the switch being processed, a configuration file is selected and converted into processing logic, ie a communications algorithm. The logic is then used within the generic agent 2 to extract the required data and provide it to a network topology tool such as NNM-ET to determine the topology of VLANs within the network.

The generic agent 2 includes a set of generic functions 8 that can be specified for use within the configuration file 1.

If, to obtain the necessary information from a switch, the use of special data processing, not provided by the set of generic functions, is required then the function 9 to perform the processing can be coded by a user and added to the list of functions available to the agent.

The user functions can be coded in a language such as C++ or any other suitable programming language.

EXAMPLE GENERIC FUNCTIONS

IsValueNull ( )
IsValueNonNull( )

EXAMPLE SPECIFIC FUNCTIONS FOR A FOUNDRY SWITCH

MaskBits ( )—Certain switches such as Foundry switches make use of individual bits in a byte to represent information. Thus, at times it becomes necessary to retrieve individual bit values. The MaskBits function can be used to mask unwanted bits and retrieve only the bits that are required.

The configuration file will now be described.

As explained above, there will be a generic configuration file 7 used for all switches. This will be used for extracting local neighbour details. The switch specific configuration will be captured in a different file 1 (named using the sys object id) and will consist of one or more approaches to mine the switch MIB data.

The MIB tag identifies all of the MIB OIDs (Object IDs) that may be used during the discovery of this type of switch.

The Approach tag identifies one way to discover the information required to build local and remote neighbours. This is further divided into Local, VLAN and Remote information for easy categorization. There can be multiple approaches for a given switch type.

An approach to discover Local (or VLAN or Remote) details consists of several steps that need to be evaluated one or more times. A given step consists of three key parts—

1) Identification of the step (a variable name)
2) What pre-conditions must be met if the step is to be evaluated.
3) How to evaluate the step:
Using the data retrieved from a MIB OID.
Using a value from previous step (an assignment)
Using an external function; a step evaluation may need special data processing capabilities (for example, bit manipulation)

The configuration file is stored in XML format. It will be appreciated that the file may be stored in any other suitable format, such as a CSV file.

An example of the format of a configuration file in XML format is provided below:

```
//List of all MIB Variables that will be used for this switch discovery.
//   (id)      MIB variable name
//   (List)    Is this a list or a single var bind
//
<MIB>
    <Oid>
        <ID></Id>
        <List></List>
    </Oid>
    ...
    ...
</MIB>
// One approach for computing the required information for a
switch. There could be multiple such approaches.
//
<Approach>
    //
    //Processing sequence for manipulating the MIB variables (For
```

-continued

```
local nbrs, Vlan information and Remote nbrs
//   (Name)    External identification of the step. Sort of a variable
name in a program.
//   (Match)   What conditions must satisfy before evaluating
this step. Use MatchFunc to call the function and pass values of all
the steps identified by Input.
//   (UsingMIB)    Evaluate using a MIB variable.
        If AtIndex or AtValue is present, use the identified
step's value to fetch a particular instance (matching with idex or value).
        If AtIndex or AtValue is not present, then retrieve entire list. All
children must be evaluated for all such values.
        How tells what to get from the MIB variable? Index (at which
pos) or value.
//   (UsingFunction) Evaluate using Function identified by EvalFunc. Pass
values from all the steps identified by input.
//   (UsingStep) Evaluate using a step. Used for assignment.
<Local>.
```

The processing logic for the creation of the configuration files will now be described.

In one implementation the configuration file can be generated using a GUI to create processing steps and the dependencies between them. The GUI generator can be integrated with a MIB browser to drag-and-drop OIDs.

Therefore the processing steps will be interlinked and will form a tree structure.

If a processing step is not dependent on any other step, it forms the starting of one execution scope.

The evaluation of a processing step can provide one or more results. For example an "add_ifIndex" evaluation will return a set of values and an "add_type" evaluation will return single value at the given index.

If the evaluation provides more than one result, all children processing steps, in the tree structure, for that step will be evaluated multiple times, for every result value.

Data is provided to a topology tool such as the HP Openview NNM-ET tool from this system via a single data structure, such as a table. This data structure is the mediation store.

Figure 2:
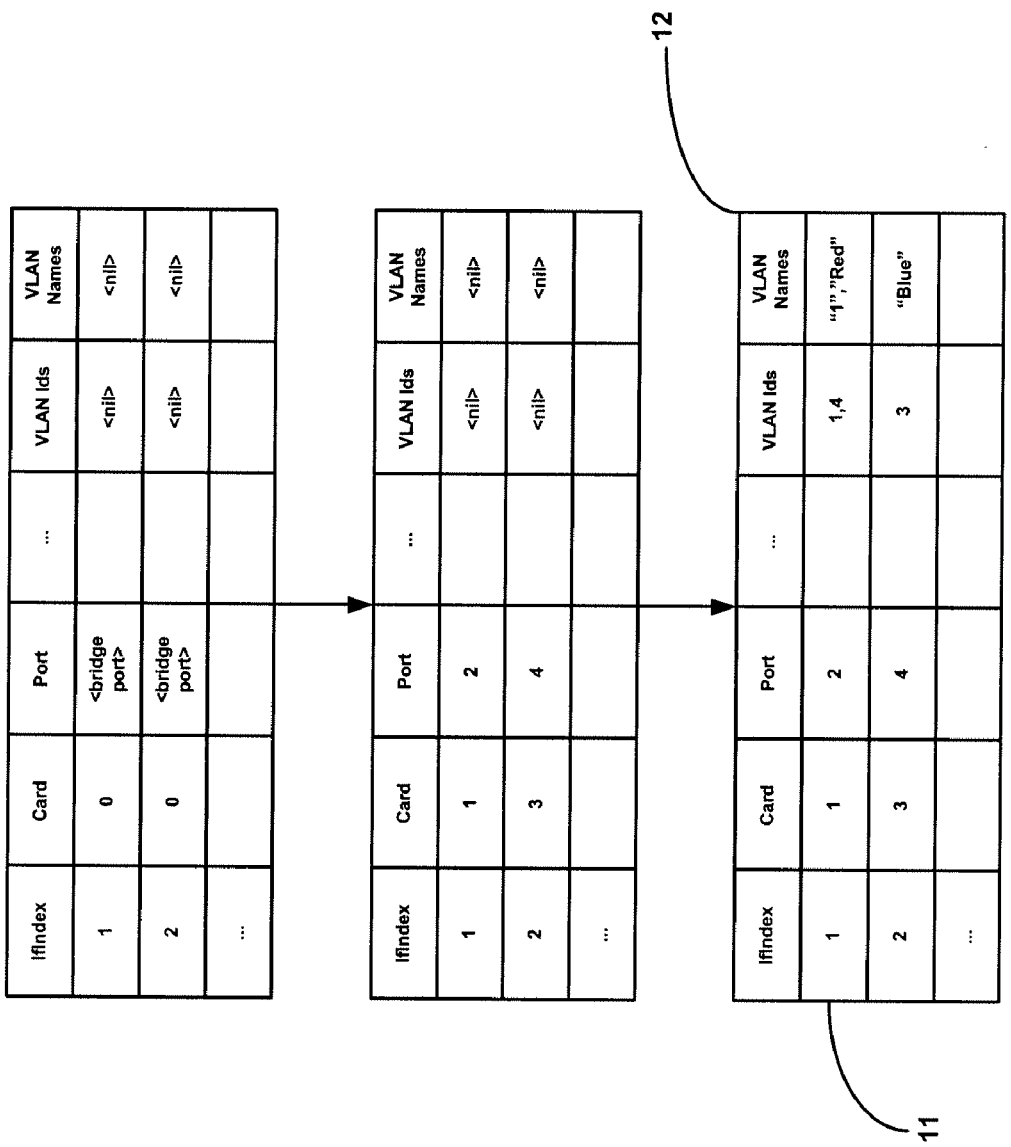
FIG. 2 shows tables illustrating how the data acquired is constructed.

After evaluation of a step, and as illustrated in FIG. 2, the output will be added to an output row 11 if applicable. Once an output row 11 is filled, it will be added to the set 12 of output values within the mediation store.

Execution of the processing logic within a configuration file by the generic discovery agent will now be described.

The processing logic for a switch type is built only once. Every invocation to interrogate a switch creates an instance of the build as it requires storage to keep the evaluated values. It also required storage to create the final output (the mediation store) that will go to the network topology tool.

The DownloadLocalNeighbours entry point execution sequence is as follows:

i) Extract the OID from the input device record.

ii) Find the appropriate configuration and read it if not already read.

iii) Create the processing logic in the form of interlinked steps in a tree structure if not already created.

iv) Execute the generic steps and creates output rows (one per ifIndex on the switch).

v) Execute the local steps that update each output row's card and port information.

vi) Execute the VLAN steps that update the above output with VLAN details.

vii) Builds local neighbour records of the output rows and puts into the mediation store.

The Download Fdb Table entry point execution sequence is as follows:

i) Extract the OID from the input device record ii) Execute the remote steps iii) Use this data and the local neighbours from the mediation store and creates remote neighbours.

iv) Add the remote neighbour to the mediation store.

Figure 3:
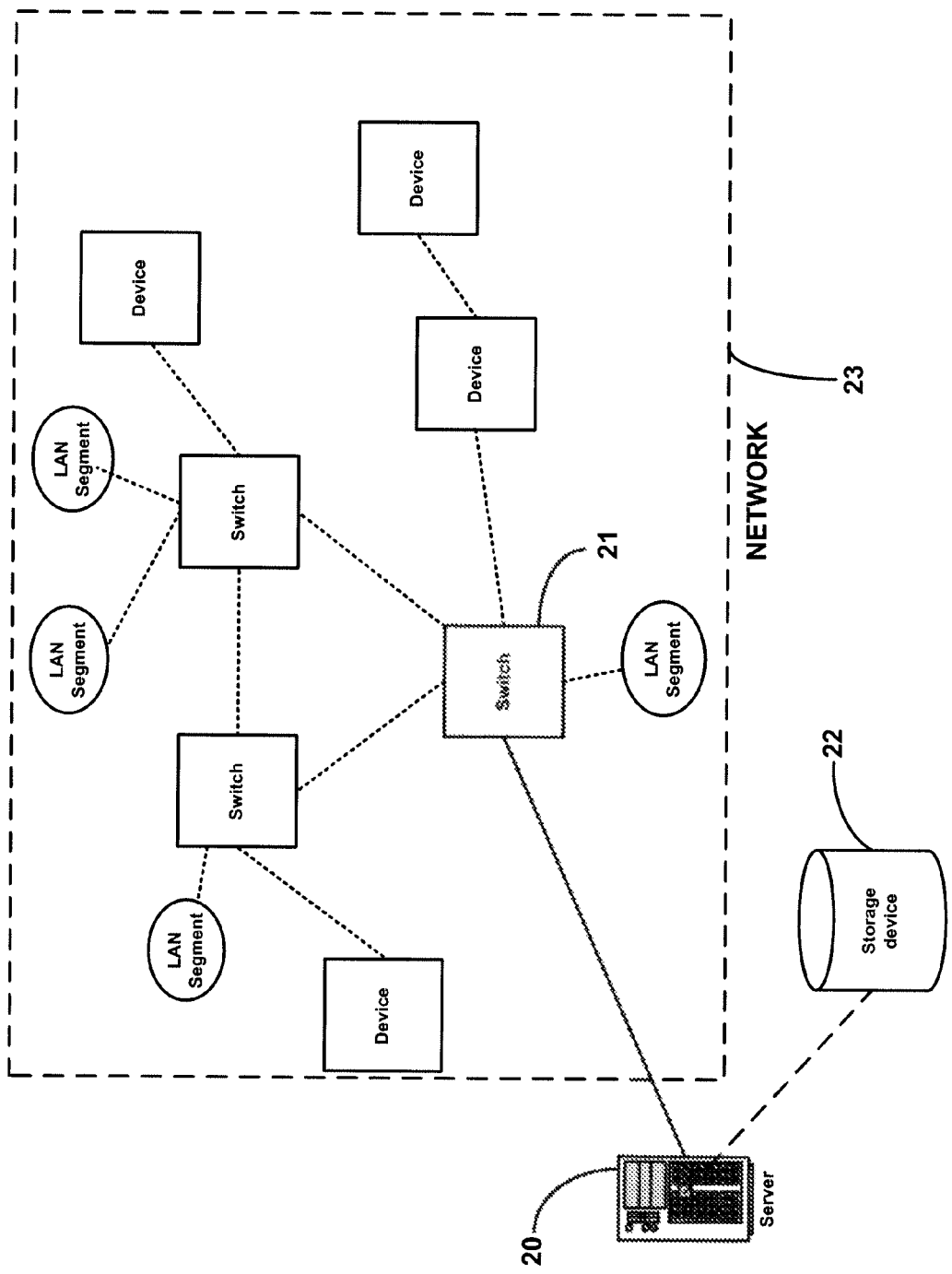
FIG. 3 shows a block diagram illustrating how the techniques could be deployed on hardware.

Referring to FIG. 3, an implementation of the invention will be described.

In this implementation, the generic discovery agent program is coded in C++. It will be appreciated that any other suitable language may be used, such as Java.

The program is deployed on a server 20 connected, directly or indirectly, to a network device 21 such as a switch. The server has access to a storage device 22. The storage device 22 contains the user functions and the configuration files.

The program interrogates the network 23 to obtain information about the network devices residing thereon. The information is used by a network topology tool to establish the topology of the network particularly in relation to the VLANs within the network. One advantage of the present invention is that only a single discovery agent is required. However, it will be appreciated that more than one instantiation of the single agent could be used if required.

There has thus been described a method for determining the topology of a network, including the step of: a generic agent communicating with a plurality of network devices, using a network management protocol, in order to extract data about the network; wherein the generic agent includes a communication algorithm and wherein each network device corresponds to one of a plurality of network device types and the algorithm is adjusted for each network device using a configuration schema based on the corresponding network device type.

The data extracted from the network can relate to one or more virtual local area networks within the network. At least one of the network devices can be a switch.

A network topology tool may use the extracted data to determine one or more virtual local networks within the network.

The data extracted may include interface details of the network device, VLAN configuration details of the network device, and/or details of a second network device where the Internet Protocol address of the second device matches an entry within a forwarding database on the network device.

One or more network device types may be associated with two or more different configuration schema.

The communication algorithm may be adjusted for each network device using a configuration schema based on the corresponding network device type and a generic configuration schema. The generic configuration schema may include steps to extract the interface details. The interface details may be extracted from a Management Information Base table on the network device.

A user may create at least one of the configuration schemas. The user may utilise a GUI engine to create the configuration schemas and wherein the GUI is arranged to create processing steps and dependencies between processing steps. The GUI engine may be integrated within a Management Information Base browser such that the user drag-and-drops Object IDs from the browser into the GUI to assist within the creation of the configuration schema.

A system has also been described for determining the topology of a network, including:

a processor arranged for communicating with a plurality of network devices, using a network management protocol, in order to extract data about the network; and a storage device arranged for storing a plurality of configuration schema. wherein the processor communicate using a communication algorithm and wherein the algorithm is adjusted for a network device using a configuration schema based on the network device type.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. A method for determining the topology of a network, comprising:
   determining, at a computing device, a particular network device among a plurality of network devices from which information is sought;
   adjusting, by the computer device, a discovery algorithm based on a device type of the particular network device wherein the discovery algorithm is adjusted based on a configuration schema associated with the device type of the particular network device and wherein the configuration schema comprises a generic configuration file and a device specific configuration file;
   communicating, by the computing device, in accordance with the discovery algorithm to extract information from the particular network device, wherein the extracted information is from a Management Information Base (MIB) table, a proprietary MIB table and a Bridge MIB table located in the particular network device; and
   determining, by the computing device, at least part of the topology of the network based on the information extracted from the particular network device.

2. A method as claimed in claim 1, wherein the information extracted from the particular network device includes virtual local area network (VLAN) configuration details of the particular network device.

3. A method as claimed in claim 1, wherein the information extracted from the particular network device includes details of a second network device, where the Internet Protocol address of the second network device matches an entry within a forwarding database of the particular network device.

4. A method as claimed in claim 1, wherein the information extracted from the particular network device includes interface details of the particular network device.

5. A method as claimed in claim 1, wherein the configuration schema is in extensible markup language (XML) format.

6. A method as claimed in claim 1, wherein the configuration schema is created in part by a user.

7. A method as claimed in claim 1, wherein the configuration schema is created in part through the use of a GUI engine that is configured to create processing steps and dependencies between processing steps.

8. A method as claimed in claim 7, wherein the GUI engine is integrated within a Management Information Base browser such that Object IDs can be dragged-and-dropped from the browser into the GUI engine to assist within the creation of the configuration schema.

9. A device for determining the topology of a network, comprising:
   a communication interface configured to communicate with a plurality of network devices;
   a processor; and
   a storage device including computer-readable instruction stored therein that, upon execution by the processor, cause the device to:
   determine a particular network device among the plurality of network devices from which information is sought;
   adjust a discovery algorithm based on a device type of the particular network device, wherein the discovery algorithm is adjusted based on a configuration schema associated with the device type of the particular network device and wherein the configuration schema comprises a generic configuration file and a device specific configuration file;
   communicate, via the communication interface, in accordance with the discovery algorithm to extract information from the particular network device, wherein the extracted information is from a Management Information Base (MIB) table, a proprietary MIB table and a Bridge MIB table located in the particular network device; and
   determine at least part of the topology of the network based on the information extracted from the particular network device.

10. A storage device having stored thereon, computer-executable instructions that, if executed by a device, cause the device to perform a method comprising:
    determining, at the device, a particular network device among a plurality of network devices from which information is sought;
    adjusting a discovery algorithm based on a device type of the particular network device wherein the discovery algorithm is adjusted based on a configuration schema associated with the device type of the particular network device and wherein the configuration schema comprises a generic configuration file and a device specific configuration file;
    communicating in accordance with the discovery algorithm to extract information from the particular network device, wherein the extracted information is from a Management Information Base (MIB) table, a proprietary MIB table and a Bridge MIB table located in the particular network device; and
    determining at least part of the topology of the network based on the information extracted from the particular network device.

11. A storage device as claimed in claim 10, wherein the configuration schema is created in part by a user.

12. A device as claimed in claim 9, wherein the information extracted from the particular network device includes details of a second network device, where the Internet Protocol address of the second network device matches an entry within a forwarding database of the particular network device.

13. A device as claimed in claim 9, wherein the configuration schema is created in part by a user.

* * * * *